United States Patent
Lowe

(10) Patent No.: US 8,579,196 B1
(45) Date of Patent: Nov. 12, 2013

(54) ENHANCED UTILITY TAG SCAN METHOD

(71) Applicant: Ray Lowe, Austin, TX (US)

(72) Inventor: Ray Lowe, Austin, TX (US)

(73) Assignee: Ray Lowe, Austin, TX (US)

( * ) Notice: Subject to any disclaimer, the term of this patent is extended or adjusted under 35 U.S.C. 154(b) by 0 days.

(21) Appl. No.: 13/835,527

(22) Filed: Mar. 15, 2013

(51) Int. Cl.
*G06K 7/00* (2006.01)

(52) U.S. Cl.
USPC .......................................... 235/439; 235/435

(58) Field of Classification Search
USPC .................................. 235/435, 439
See application file for complete search history.

(56) References Cited

U.S. PATENT DOCUMENTS 5,481,096 A * 1/1996 Hippenmeyer et al. ........ 235/454
6,371,371 B1 * 4/2002 Reichenbach ................. 235/454

* cited by examiner

*Primary Examiner* — Daniel Hess
*Assistant Examiner* — Rafferty Kelly

(57) ABSTRACT

This application relates to a method for increasing the utility and usage efficiency of locally scanned tags including of one or multi-dimensional bar codes, Near Field Communication (NFC) tags, and tags employing other sensory means. My method uses scanner sensed information about at least one of relative orientation, relative position or relative motion, between scanner and local tag when scanning it, to provide a means for directly selecting one of a plurality of predefined scanner activity requests. Prior to this method a single tag scan action always directly resulted in the same scanner activity request. This method can be embodied as the subsystem out of which an efficient single or multiple level scanner activity request selection interface can be advantageously implemented for a wide range of scanner based applications. Typical mobile smart phones and warehouse and retail scanners are examples of scanner device categories that may employ this method.

12 Claims, 6 Drawing Sheets

Figure 1:
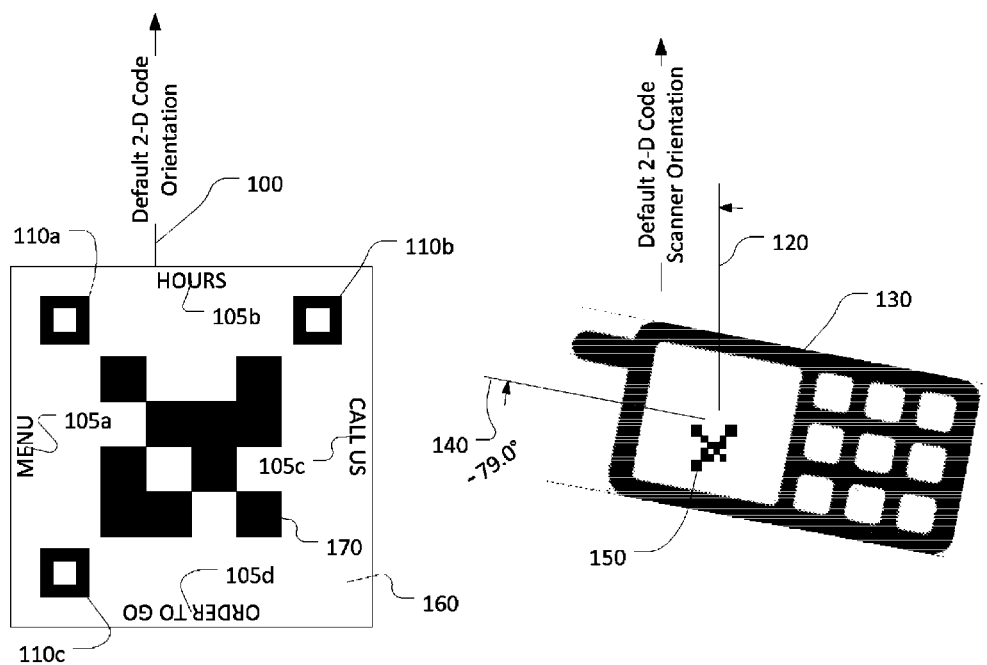

| Provided Estimate of Relative Orientation | Round to Quantized Value / User Selection | Mapped to Scanner Activity Request |
|---|---|---|
| At least -135 degrees and less than -45 degrees | -90 / MENU | Open Web Browser at URL of Restaurant Menu |
| At least -45 degrees and less than +45 degrees | 0 / HOURS | Open Web Browser at URL of Restaurant Hours |
| At least +45 degrees and less than +135 degrees | 90 / CALL US | Use Phone Application to Call Restaurant |
| At least +135 degrees or less than -135 degrees | 180 / ORDER TO GO | Open Web Browser at URL for Placing To Go Order |

Fig. 2

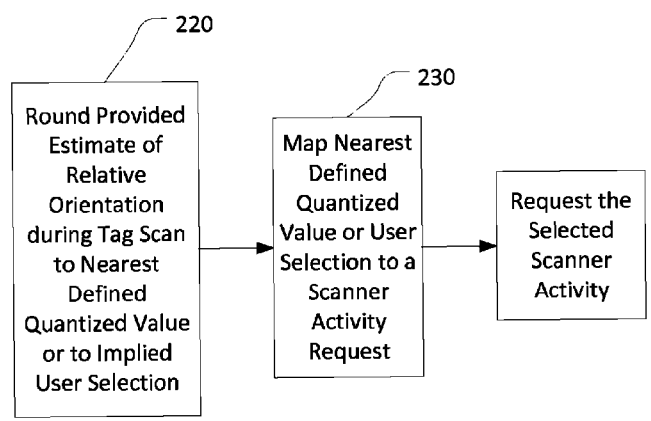

Fig. 3

| Provided Estimate of Relative Position | Round to Quantized Value / User Selection | Mapped to Scanner Activity Request |
|---|---|---|
| Negative horizontal and positive vertical | Top Left / MENU | Open Web Browser at URL of Restaurant Menu |
| Positive horizontal and positive vertical | Top Right / HOURS | Open Web Browser at URL of Restaurant Hours |
| Negative horizontal and negative vertical | Bottom Left / CALL US | Use Phone Application to Call Restaurant |
| Positive horizontal and positive vertical | Bottom Right / ORDER TO GO | Open Web Browser at URL for Placing To Go Order |

Fig. 5

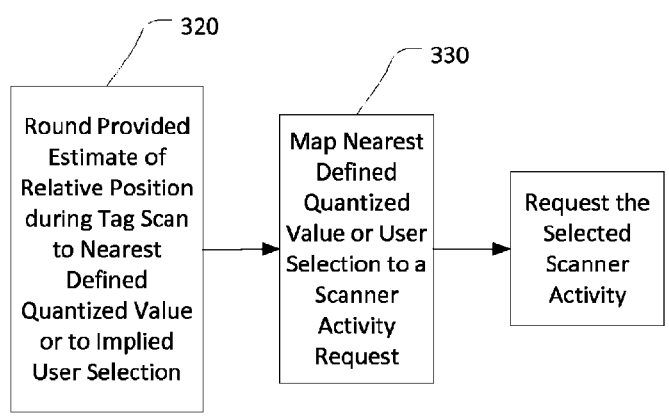

Fig. 6

| Provided Estimate of Relative Path of Motion Of Scanner During 3 Seconds After Tag Scanned | Round to Quantized Value / User Selection | Mapped to Scanner Activity Request |
|---|---|---|
| Dominant scanner movement is towards left of scanner field of view | Path 1 / MENU | Open Web Browser at URL of Restaurant Menu |
| Dominant scanner movement is towards top of scanner field of view | Path 2 / HOURS | Open Web Browser at URL of Restaurant Hours |
| Dominant scanner movement is towards right of scanner field of view | Path 3 / CALL US | Use Phone Application to Call Restaurant |
| Dominant scanner movement is towards bottom of scanner field of view | Path 4 / ORDER TO GO | Open Web Browser at URL for Placing To Go Order |

Fig. 8

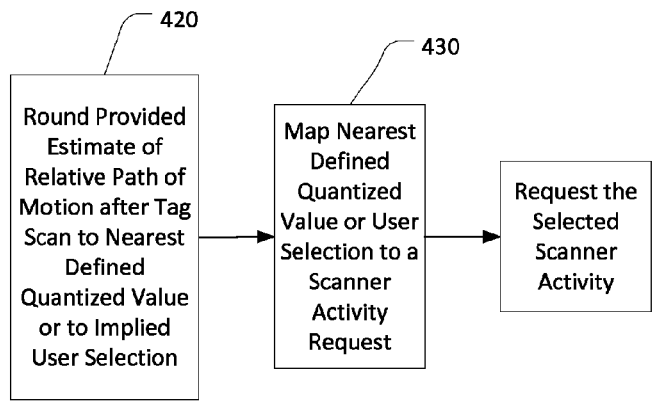

Fig. 9

ENHANCED UTILITY TAG SCAN METHOD

CROSS-REFERENCE TO RELATED APPLICATIONS

This application claims the benefit of provisional patent application Ser. Nos. 61/614,435 filed Mar. 22, 2012 by the present inventor, and 61/671,147 filed Jul. 13, 2012 by the present inventor, and 61/708,037 filed Sep. 30, 2012 by the present inventor.

BACKGROUND

Prior Art

There is great and increasing demand for more efficient or more useful methods via which users and other entities can access information from or interact with local tagged objects by means of a scanner device which forms all or part of a mobile or static information system, and which is a computer based device equipped with one or more types of tag sensor, and optionally equipped with other conventional physical sensors. Conventional mobile smart phones are often used for scanning local tags. There are several typical modes in which a scan of a tagged object can be triggered by the physical actions of at least one of a scanner user or other physical forces. The scanner may have fixed position and the tag of a tagged object is purposefully or randomly moved to within scan range of the sensor, or the tagged object may have fixed or independently controlled position and the scanner sensor is purposefully or randomly moved to within scan range of the tag, or both the scanner and the tagged object may be moved purposefully or randomly relative to each other until the scanner is within scan range of the tag.

Locally scanned single and multiple dimension bar code tags such as UPC codes, QR Codes and other standard and non-standard designs of visual tags, and also tags employing other than visual sensing such as Near Field Communications tags (NFC tags), are now in widespread use across a wide range of application areas such as advertising or second screen usage in publications, in commerce, product labeling, logistics, retail, public communications, promotions and advertising, events and meetings. While finding wide application, a common limiting factor with such tag scan based applications prior to my method is that a tag scan operation conducted by a scanner would result in directly requesting always the same one predefined activity request for the scanner to perform, which may be a control interaction with an application context of the scanner or information system of which the scanner is part. Exemplary uses of the one predefined scanner activity request are opening a browser at a specific URL, or opening a specific application on the scanner or information system of which the scanner is part. Prior to my method, a scanner user could only make a choice of scanner activity request for a tag scan, outside of the physical single tag scan action, by means of at least a second separate action such as choosing from a menu subsequently presented in a conventional user interface or a subsequent action such as pressing a hardware button. Tags typically contain a predefined data payload whose purpose can be predefined as at least one of providing information, or providing a data structure that is intended to be readily interpreted as an activity request for the scanner.

My method provides an enhanced tag scanning method by means of which the sensed and estimated physical manner with which a tag is scanned is rounded to the nearest available of a predefined set of quantized values. Each of those available quantized values is mapped via a predefined set of mappings to one of a plurality of possible activity requests for the scanner which have been predefined as associated with the tag. Predefined activities can do at least one of, modify or parse or otherwise conventionally process the decoded data payload of the tag before making it available or request a specific activity be performed by the scanner with or without reference to the raw or processed data payload of the tag. According to my method the estimated and quantized physical manner with which a tag is scanned is mapped to requesting one out of a plurality of predefined activities for the scanner to perform. This mapping acts as a one of a plurality selection.

According to my method, the definition of the said set of quantized values may be fixed, or may be dynamically redefined on a per tag scan action basis using conventional means including information obtained from parsing or otherwise conventionally manipulating the conventionally decoded payload of the tag being scanned. According to my method, the definition of the said set of activity requests may be fixed, or may be dynamically redefined on a per tag scan action basis using conventional means including information obtained from parsing or otherwise conventionally manipulating the conventionally decoded payload of the tag being scanned. According to my method, the definition of the said set of mappings may be fixed, or may be dynamically redefined on a per tag scan action basis using conventional means including using information obtained from parsing or otherwise conventionally manipulating the conventionally decoded payload of the tag being scanned.

My method is backwards compatible to work with any of the many tag design standards in current widespread use which incorporate implicit or explicit positional or orientation reference markers, as well as to work with other tag designs incorporating such reference markers. My method is also compatible to work with any locally sensed tag type using any sensing method whereby the tag's rotational component of orientation (hereafter referred to as orientation), or translational component of orientation (hereafter referred to as position), or motion relative to the scanner sensor of a scanner equipped with conventional orientation, position, or motion sensors respectively, can be reliably deduced from context as would be the case when a tag is firmly affixed in a predefined manner to an object whose respective orientation, position, or motion are already known to the scanner.

This paragraph applies to visual tags when used with my method. Tags employing visual sensory methods that lie to either side of the spectrum of human perception such as infra-red or ultra-violet are to be considered visual methods for the purpose of this description, just as much as those that employ human perceptible wavelengths. Many visual tag designs in current use were designed with implicit or explicit reference markers because they were intended to always result in their one predefined activity request to the scanner, upon being scanned and despite being scanned with a wide range of possible orientations or positions relative to the scanner. A conventional visual tag scanner employing conventional scanner algorithms uses those said reference markers to automatically transform the scanner data from a tag scan, which will typically exist in scanner memory in geometrically distorted and translated form due to being scanned with a wide possible range of orientation and position relative to the plane and position of the sensor, to a geometrically normalized form prior to attempting to decode the data payload of the tag. By virtue of these reference markers most visual tag designs in current use are compatible with my method without requirement for any modification.

ADVANTAGES

My method provides one of a plurality outcome selection utility to a single tag scan activity, where the outcome is a particular one of a predefined set of scanner activity requests, and where the scanner forms all or part of a mobile or static information system which the scanner may act upon via said activity requests. This enables new, more flexible, more efficient applications of local tag scanners in many common application areas such as consumer, commercial, logistics, and others, whereby a selection of one out of a plurality of predefined activity requests to the scanner can be made as the direct result of the physical manner with which a single tag scan action is performed. These requested activities act upon at least one of the scanner or associated information system. Efficiency improvement translates into improved business outcomes such as service usage, customer loyalty, or perceived value, in the case of commercial applications. It also translates into improved safety in applications where distraction or delay is hazardous. It also allows for a plurality of scanner activity requests to be overlaid on top of the single scanner activity request of pre-existing tags, thus giving them additional utility without requiring any physical modification of them. My method can be embodied as the subsystem out of which an efficient single or multiple level scanner activity request selection interface can be advantageously implemented for a wide range of conventional and new scanner applications. Ubiquitous scanner devices such as typical mobile smart phones and warehouse and retail scanners are examples of device categories that may employ this method to advantage with a wide range of applications.

SUMMARY

My method provides direct one of many outcome (scanner activity request) selection utility to a single tag scan action. My method supplies this utility to a tag scanner device which forms all or part of a mobile or static information system. My method uses as input one or more parameters representing the physical manner with which a tag scan is made by the scanner. More specifically, this manner is represented relative to the sensor of the scanner in case the sensor is not rigidly affixed to the scanner.

For said parameters my method uses at least one of the following types of parameter: the sensed and estimated relative orientation, or the sensed and estimated relative position, or the sensed and estimated relative motion between the tag sensor and the tag (or vice versa) during a tag scan. These are digital values. Depending upon the specific application, one, two, or all three of said parameter types will serve as inputs to my Method. Depending upon the tag sensor type or types available in the scanner device and upon the availability of conventional physical position and orientation sensors in the scanner device, and upon the needs of a particular application, any combination of one, two, or all three of these parameter types can be used as input to my method. An exemplary type of tag sensor that can support estimation of relative orientation in a two dimensional plane (relative rotation) is a conventional two dimensional camera type sensor. In this case a convenient choice of two dimensional plane to use would be that occupied by the camera's imaging sensor.

My method requires definition of a set of at least two quantized values to represent the expected range of values of each of the available input parameter types. The quantization can be linear or non-linear. My method then rounds the value of each of the provided types of input parameter, as estimated by the sensors during the tag scan action, to the nearest available predefined quantized value. This resulting combination of rounded parameter values from all of the one, two, or three available parameter types in use as input to my method then represents the quantized estimated scan manner with which the tag was physically scanned.

My method requires definition of the mapping, between quantized estimated scan manner and scanner activity request. The said mapping must be defined for each of the set of possible combinations of values from the one, two, or three available predefined types of quantized estimated parameters used as input. The scanner activity request may be a request to do nothing, as well as to do something. The mapping is achieved by means of a predefined mapping table or by means of algorithmic mapping between quantized estimated scanning manner and scanner activity request. My method does not place any limitations on the format of the scanner activity request as this is purely application dependent and can take many conventional or custom forms.

When a tag is scanned, my method then maps said quantized estimated scan manner to a scanner activity request by means of the said predefined mapping of quantized estimated scan manner to scanner activity request.

DRAWINGS

Figures

FIG. 1 shows a practical application example of the first embodiment of my method wherein a mobile phone scanner device 130 has a conventional two dimensional bar code type of tag 160 comprised of a data payload 170 and explicit positional markers 110a, 110b, 110c, in the field of view 150 of its digital camera type of visual tag scanner sensor, and the relative orientation which in this example is estimated as rotation in the two dimensional plane of the scanner sensor, between the predefined as default orientations of the scanner sensor and the tag is minus 79 degrees 140.

FIG. 2 shows the quantized estimated relative orientation, and equivalent user selection meaning 200, predefined by my method for representing respective ranges of the estimated relative orientation parameter 240 that is measured using conventional means (not shown) and provided to my method. FIG. 2 also shows the mapping 210 predefined by my method between each value of quantized estimated relative orientation and a respective scanner activity request.

FIG. 3 shows my method in flow chart form for an embodiment that uses the provided estimated relative orientation between scanner sensor and tag during scanning to represent the single tag scan action physical manner of scanning.

Figure 4:
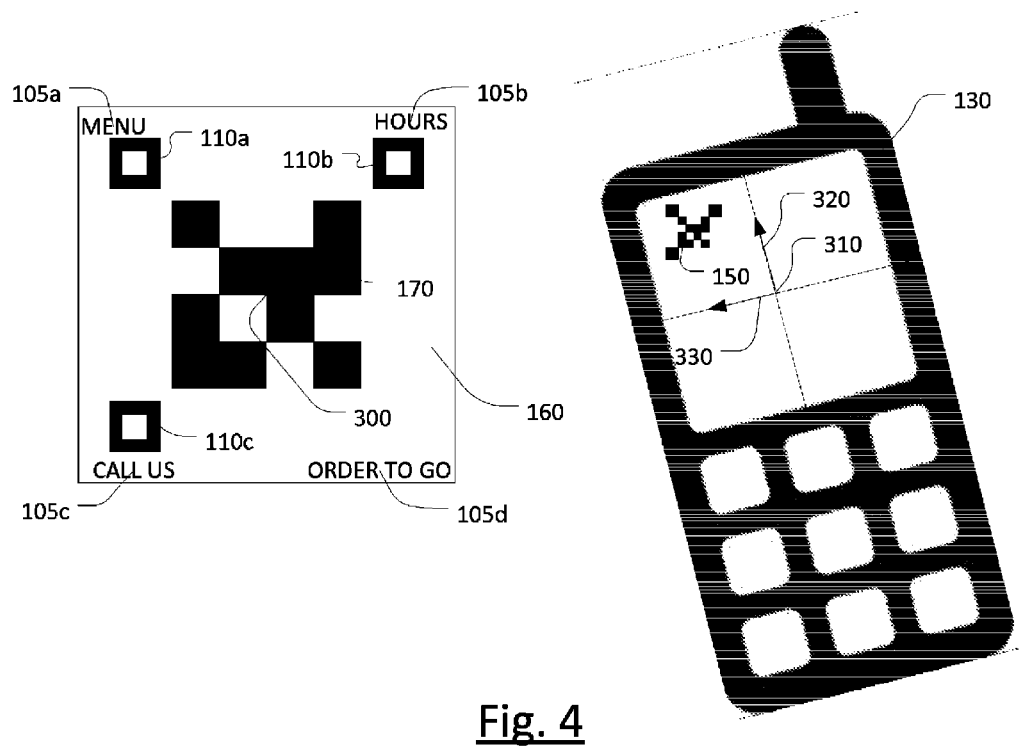

FIG. 4 shows a practical application example of a second and alternative embodiment of my method wherein a mobile phone scanner device 130 has a conventional two dimensional bar code type of tag 160 comprised of a data payload 170 and explicit positional markers 110a, 110b, 110c, in the field of view 150 of its digital camera type of visual tag scanner sensor, and the two dimensional relative position between the predefined as default point on the tag (the center of the tag) 300 and the predefined as default point on the scanner sensor (the center of the field of view of the digital camera) 310 is negative in horizontal 330 axis and positive in vertical 320 axis.

FIG. 5 shows the quantized estimated relative position and equivalent user selection meaning 300, predefined by my method for representing respective ranges of the estimated relative position parameter 340 that is measured using conventional means (not shown) and provided to my method. FIG. 5 also shows the mapping 310 predefined by my method between each value of quantized estimated relative orientation and a respective scanner activity request.

FIG. 6 shows my method in flow chart form for an embodiment which uses the provided estimated relative position between scanner sensor and tag during scanning to represent the single tag scan action physical manner of scanning.

Figure 7:
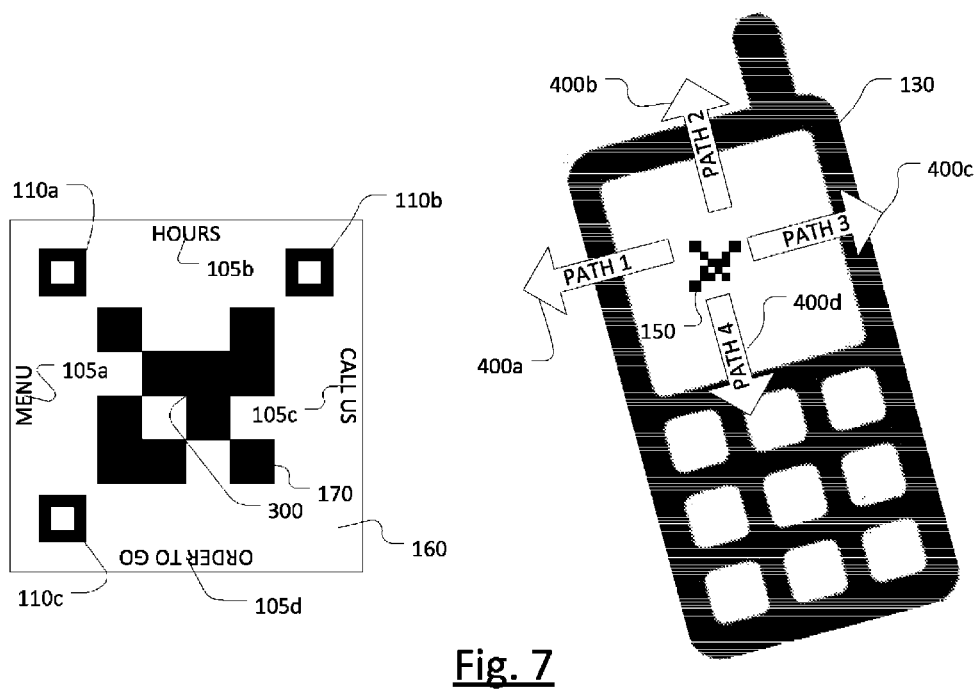

FIG. 7 shows a practical application example of a third and alternative embodiment of my method wherein a mobile phone scanner device 130 has a conventional two dimensional bar code type of tag 160 comprised of a data payload 170 and explicit positional markers 110a, 110b, 110c, in the field of view 150 of its digital camera type of visual tag scanner sensor. In FIG. 7 the two dimensional estimated relative path of motion, occurring in a three second time period following tag scanning, between the predefined as default point on the scanner sensor (the center of the field of view) and the predefined as default point on the tag (the center of the tag) 300, will be provided to my method. My method will round the provided estimated path of motion to the nearest one of the predefined quantized paths of motion 400a, 400b, 400c, 400d.

FIG. 8 shows the quantized estimated relative path of motion and equivalent user selection meaning 400, predefined by my method for representing respective ranges of the estimated relative path of motion parameter 440 that is measured using conventional means (not shown) and provided to my method. FIG. 8 also shows the mapping 410 predefined by my method between each value of quantized estimated relative orientation and a respective scanner activity request.

FIG. 9 shows my method in flow chart form for an embodiment which uses the provided estimated relative path of motion between scanner sensor and tag during a three second window after the tag scan to represent the single tag scan action physical manner of scanning.

DETAILED DESCRIPTION

First Embodiment

FIG. 1 shows an embodiment of my method in a tag scan based information system which supplies information and services for a particular restaurant. In this embodiment my method uses only the sensed and estimated relative orientation parameter type as input. In this embodiment my method uses only the provided sensed and estimated value of two dimensional relative orientation (2DRO) 140 between a predefined reference orientation of the tag sensor 120 and a predefined reference orientation of the tag 100 (or vice versa), as measured in a predefined plane which in this embodiment is the plane of the tag scanner sensor, as the sensed physical performance characteristic of a tag scan action. Said 2DRO measured in the two dimensional plane of the scanner sensor is equivalent to relative angular rotation about an axis perpendicular to said plane.

I presently contemplate that 2DRO is measured in the plane parallel to that of the tag scanner sensor. However, any convenient reference plane can be used.

In this embodiment of my method neither the tag nor the scanner are fixed in space or relative to one another. The scanner sensor, which is part of a mobile phone 130, is a digital camera type device which is configured to take a focused digital image of whatever is introduced in its field of view. Upon image capture the image is saved as bit map. A conventional algorithm then searches this image bit map for the presence of and the locations (relative to the origin of the bit map) of intrinsic or explicit positional markers 110a, 110b, 110c of one or multi-dimensional visual type tag designs with design features known to the scanner. When the scanner field of view 150 contains one of these known tag types 160 and when the camera resolution, focus and exposure are all sufficient to support it, then a bit mapped image of the tag will be in the captured bit map and the estimated position of the positional markers of the tag will become available, as will be the estimated identification of the design type of the tag (tag type). Estimating the position of these markers in the captured bitmap is typically a necessary and conventional scanner processing step for at least one of identifying the tag type or geometrically normalizing the image prior to decoding the tag data payload, as the estimated marker positions are typically used as input parameters to a conventional two dimensional transform algorithm which performs the normalization. These estimated marker positions are transformed by means of a conventional algorithm into the 2DRO in any conventional or convenient units. My method does not specify the sensor type or the appropriate conventional means by which to determine an estimate of 2DRO during the scan action. In this embodiment my method takes 2DRO as input. The means, conventional or otherwise, by which the 2DRO measurement estimate is produced, is of no consequence to my method.

I presently contemplate that the tag positional marker features are used to calculate the 2DRO. However, any other convenient means of estimating and providing 2DRO to my method can be used.

I presently contemplate that the tag is a visual type of tag. However, the tag type can use other means of local sensing by the scanner. For example, it can be a Near Field Tag rigidly and with predefined orientation affixed to an object with predefined orientation, in which case the tag can be scanned using electromagnetic sensing via an induction coil type of sensor and the scanner device will include other conventional sensors that directly or indirectly provide the 2DRO to my method.

In FIG. 2 and FIG. 3, my method applies a linear quantization function to the 2DRO such that all values will be rounded to one of four possible values of quantized 2DRO (Q2DRO) 200, 220. The values selected for Q2DRO are −90 degrees, 0 degrees, +90 degrees, and +180 degrees. Thus, in this example, −90 degrees is equivalent to scanning the tag with the top of the scanner oriented approximately towards the left side of the tag. +180 degrees is equivalent to scanning the tag with the scanner approximately upside down relative to the tag, and so on.

I presently contemplate that the number of quantization steps is 4 and that the quantization is linear. However, the number of quantization steps and the choice of linear versus non-linear quantization are not specified by my method and these choices are left as application dependent parameters. My method requires the defined mapping 210, 230 of each quantization step to a predefined activity request for the scanner to perform.

I presently contemplate that the rounding to the nearest quantized value and the mapping of said quantized value to scanner activity request are separate operations. However, it is possible to perform rounding and mapping as one operation without need for a assigning an intermediate quantized value.

I presently contemplate that the set of predefined activity requests 210 for the scanner is "Menu" 105a which requests the scanner activity to open a web browser application at the URL of the restaurant's menu web page, "Hours" 105b which requests the scanner activity to open a web browser application at the URL of the restaurant's opening hour schedule web page, "Call Us" 105c which requests the scanner activity to open a phone application and call the restaurant, "Order To Go." 105d which requests the scanner activity to open a web browser application at the URL of the restaurant's ordering web page. However, the set of predefined scanner activity requests is wholly application dependent.

I presently contemplate that each quantization step maps to a unique scanner activity request. However, more than one quantization step may map to the same scanner activity request, and it is not necessary for all quantization steps to map to a scanner activity request. The form that a scanner activity request takes is not specified by my method. Different designs of scanner device will typically have different but conventional formats for the scanner activity request data object or signal.

I presently contemplate that the relative Q2DRO between tag scanner sensor and the tag being scanned is mapped to a predefined scanner activity request. However a provided offset can be subtracted from 2DRO if the application of my method uses the estimated Q2DRO of the tag relative to some other object, other than the scanner sensor, as the physical manner of scan action. In this case said other object must have a predefined or estimated 2DRO relative to the scanner sensor, that is provided to my method and used as the offset—an exemplary application of this is the application of a local tag for use with a rotary knob, where the tag is printed on the knob and the knob rotates about an axis perpendicular to said other object. Said other object serves as a backdrop for the knob and may have visual markings indicating the current value selected by the knob.

Second Embodiment

FIG. 4 shows an alternative embodiment of my method in a tag scan based information system which supplies information and services for a particular restaurant. In this embodiment my method uses only the sensed and estimated relative position 320, 330 between tag and the tag the tag sensor, in the plane of the tag sensor, as the sensed physical performance characteristic of a tag scan action.

I presently contemplate that relative position is measured in the plane parallel to that of the tag sensor. However, any convenient reference plane can be used.

In this embodiment of my method, neither the tag nor the scanner is fixed in space or relative to one another. The scanner sensor, which is part of a mobile phone, is a digital camera type device 130 which is configured to take a focused digital image of whatever is introduced in its field of view. Upon image capture the image is saved as a bit map. A conventional algorithm searches this image bit map for the presence of and the locations (in the surface represented by the bit map) of intrinsic or explicit positional markers 110a, 110b, 110c of one or multi-dimensional visual type tag designs with known design features 160. When the scanner field of view 150 contains one of these known tag types 160 and when the camera resolution, focus and exposure are all sufficient to support it, then a bit mapped image of the tag will be in the captured bit map and the estimated position of the positional markers of the tag will become available, as will be the estimated identification of the design type of the tag (tag type). Estimating the position of these markers in the captured bitmap is typically also a necessary and conventional step for at least one of identifying the tag type or normalizing the image prior to decoding the tag's data payload 170, as they are typically used as input parameters to a two dimensional transform algorithm which performs the normalization. These estimated marker positions are transformed by means of a conventional algorithm into a numerical value of estimated relative position (ERPV) in any conventional or convenient units, in the plane of the tag sensor, of the position of the tag relative to the position of the scanner sensor, or vice versa. My method uses the as ERPV as input.

I presently contemplate that the relative position is measured between the estimated center of gravity of the tag 300 and the estimated center of gravity of the sensor field of view 310. However, the relative position can be defined in other ways.

I presently contemplate that the tag is a visual type of tag. However, the tag type can use other means of local sensing by the scanner, or a combination of more than one method of local sensing whereby one method is used to sense the data payload of the tag and another is used to sense the relative position of the tag. For example, it can be a Near Field Tag affixed to an object which also has been marked with visual positional reference markers in which case the data payload of the tag can be scanned using electromagnetic sensing via an induction coil type of sensor and the visual positional markers of the tag can be scanned using visual sensing via a digital camera sensor.

My method does not specify the conventional sensor type or the appropriate conventional means by which to determine an estimate of relative position during the scan action, of the scanner sensor relative to the tag or vice versa. My method takes ERPV as input.

In FIG. 5 and FIG. 6 my method applies 320 a linear quantization function to the ERPV such that all values will be rounded 300 to one of four possible values of quantized ERPV (QERPV). The values selected for QERPV are Top Left, Top Right, Bottom Left, and Bottom Right. FIG. 4 shows an exemplary relative position where the QERPV is Top Left.

I presently contemplate that the number of quantization steps is 4 and that the quantization is linear. However, the number of quantization steps and the choice of linear versus non-linear quantization are not specified by my method because these choices are application dependent parameters. My method requires the defined mappings 310, 330 of each quantization step to a predefined activity request for the scanner to perform.

I presently contemplate that the rounding to the nearest quantized value and the mapping of said quantized value to scanner activity request are separate operations. However, it is possible to perform rounding and mapping as one operation without need for a assigning a quantized value.

I presently contemplate that the set of predefined activity requests 310 for the scanner is "Menu" 105a which requests the scanner activity to open a web browser application at the URL of the restaurant's menu web page, "Hours" 105b which requests the scanner activity to open a web browser application at the URL of the restaurant's opening hour schedule web page, "Call Us" 105c which requests the scanner activity to open a phone application and call the restaurant, "Order To Go." 105d which requests the scanner activity to open a web browser application at the URL of the restaurant's ordering web page. However, the set of predefined scanner activity requests is wholly application dependent.

I presently contemplate that each quantization step maps to a unique set of scanner activity requests. However, more than one quantization step may map to the same scanner activity request, and it is not necessary for all quantization steps to map to a scanner activity request. The form that a scanner activity request data object takes in scanner device memory or scanner device hardware signals is wholly dependent upon the application context of my method and is not specified by my method. Different designs of scanner device will typically have different but conventional formats for the request data object or signal.

Third Embodiment

FIG. 7 shows an alternative embodiment of my method in a tag scan based information system which supplies information and services for a particular restaurant. In this embodiment my method uses only the sensed and estimated relative path of motion between tag sensor and the tag during a predefined time period following a scan, as the sensed physical performance characteristic of a tag scan action.

In this embodiment of my method neither the tag nor the scanner are fixed in space or relative to one another. The scanner sensor, which is part of a mobile phone 130 with a means for sensing the path of motion of the scan sensor, is a digital camera type device which is configured to take a focused digital image of whatever is introduced in its field of view 150. When a user introduces a visual tag of design type known to the scanner into the field of view of the scanner and when the camera resolution, focus and exposure are all sufficient to support it, then a conventional decode of the tag data payload is performed. My method predefines a set of quantized paths of relative motion (QPRMs) 400a, 400b, 400c, 400d. Each QPRM represents one possible shape and direction of estimated motion with which a predefined point of the tag scanner sensor could be moved relative to a predefined point of the tag (or vice versa) during three seconds. My method requires the defined mapping 410, 430 of each of the predefined QPRMs to a predefined activity request for the scanner to perform.

The scanner user, having by conventional means been made aware of these QPRMs and their mappings to possible scanner activity requests, physically controls at least one of the scanner or the tagged object.

The scanner user introduces the tag into the field of view of the scanner's camera 150 and holds it there steady for long enough that the camera captures its image, and then during the following three seconds moves the scanner sensor relative to the tag in a physical manner that approximates the QPRM he has chosen. The scanner uses conventional sensor data and conventional algorithms to estimate the relative path of motion of the predefined point of the sensor relative to the predefined point of the tag, and provides this estimated relative path of motion to my method. My method does not specify the conventional sensor type or the appropriate conventional means by which to determine an estimate of relative path of motion during the three seconds following the tag scan, of the scanner sensor relative to the tag or vice versa. My method takes the estimated path of motion as input.

My method rounds the provided estimated relative path of motion to the nearest one of the predefined set of quantized QPRMs 400, 420. My method applies the mapping of QPRM to scanner activity request to this QPRM to request the respective predefined scanner activity 410, 430.

I presently contemplate that the rounding to the nearest quantized value and the mapping of said quantized value to scanner activity request are separate operations. However, it is possible to perform rounding and mapping as one operation without need for a assigning a quantized value.

I presently contemplate that the set of predefined activity requests 410 for the scanner is "Menu" 105a which requests the scanner activity to open a web browser application at the URL of the restaurant's menu web page, "Hours" 105b which requests the scanner activity to open a web browser application at the URL of the restaurant's opening hour schedule web page, "Call Us" 105c which requests the scanner activity to open a phone application and call the restaurant, "Order To Go." 105d which requests the scanner activity to open a web browser application at the URL of the restaurant's ordering web page. However, the set of predefined scanner activity requests is wholly application dependent.

I presently contemplate that this embodiment uses only the sensed and estimated relative motion between tag sensor and the tag, during a predefined time period of three seconds following a conventional tag scan, as the sensed physical performance characteristic of the tag scan action. However, it is possible to use at least one of the sensed and estimated relative motion between tag sensor and the tag during any length of predefined time period following, or during a predefined time prior to, a scan of the tag by the tag sensor as the sensed physical performance characteristic of the tag scan action.

Fourth Embodiment

In an alternative embodiment my method uses at least two of the sensed and estimated relative orientation or the sensed and estimated relative position or the sensed and estimated relative motion between tag sensor and the tag as the sensed physical performance characteristic of a tag scan action.

CONCLUSION, RAMIFICATIONS, AND SCOPE

While my above description contains many specifics, these should not be construed as limitations on the scope, but rather as an exemplification of several embodiments thereof. Many other variations are possible. For example:

- My method is not limited to work only with a particular tag type. It can work with conventional or non-conventional tag designs, and tags that use a variety of modes of scanner sensing.
- An offset can be subtracted from 2DRO if the application of my method uses the estimated 2DRO of the tag relative to some other object, besides the scanner sensor, as the physical manner of scan action. Said other object must have a predefined or estimated relative 2DRO relative to the scan sensor that is known to the scanner.
- The range of applications of my method will increase as at least one of scanner sensor resolution or scanner processing power increase.
- Relative position can be measured between the estimated center of gravity of the sensor field of view and the estimated center of gravity of the tag, or in other ways such as between the estimated lower left corner of the sensor field of view and the estimated lower left corner of the tag.
- The tag type can use a single method of local sensing such as visual, or a combination of more than one method of local sensing. For example, it can be a Near Field Tag affixed to an object which also has been marked with visual positional reference markers in which case the data payload of the tag can be scanned using electromagnetic sensing via an induction coil type of sensor and the visual positional markers of the tag can be scanned using visual sensing via a digital camera sensor.
- My method does not specify the appropriate conventional means by which to determine an estimate of relative orientation during the scan action of the scanner sensor relative to the tag or vice versa.
- My method does not specify the appropriate conventional means by which to determine an estimate of relative position during the scan action of the scanner sensor relative to the tag or vice versa.

My method does not specify the appropriate conventional means by which to determine an estimate of relative path of motion during the scan action of the scanner sensor relative to the tag or vice versa, which includes at least one of a predetermined time period before, during, or after the tag is scanned by the tag sensor.

Predefined scanner activity requests triggered by my method are completely application dependent in both form and function.

None, some, or all of the predefined parameters upon which my method depends may be dynamically redefined by conventional means by interpreting or otherwise conventionally processing the conventionally decoded data payload of a tag being scanned. This is application dependent.

None, some, or all of the predefined parameters upon which my method depends may be dynamically redefined by conventional means based upon time, date, location, or any other available conventional contextual information. This is application dependent.

My method can be embodied as the subsystem out of which an efficient single or multiple level scanner activity request selection interface can be implemented for a wide range of conventional and new scanner applications.

Ubiquitous devices such as typical mobile smart phones and warehouse and retail scanners are examples of scanner device categories that may employ my method.

An embodiment of my method can use at least one of the sensed and estimated relative orientation or the sensed and estimated relative position or the sensed and estimated relative motion between tag sensor and the tag as inputs to represent the tag scan action's physical performance characteristic whose estimated and rounded value is mapped to a respective scanner activity request.

Accordingly, the scope should be determined not by the embodiments illustrated, but by the appended claims and their legal equivalents.

I claim:

1. A single action local tag scan method for providing a one of a plurality selection of scanner activity request, comprising:
   a. providing that the method is implemented within a tag scanner device which forms all or part of a mobile or static information system,
   b. providing the tag scanner device is implemented by firmware or software, running on any combination of conventional computer, processor, or logic device, and that it has one or more types of local tag scan sensor functionally and physically integrated with it,
   c. providing, optionally, that the tag scanner device has one or more conventional physical orientation sensors having fixed orientation relative to the scanner sensor, and that are functionally and physically integrated with it,
   d. providing a local information tag intended for use with one or more of the application context or application contexts of the information system, which when moved to within scan range will be scanned by the tag scan sensor, and whose relative orientation during the scan will be estimated by the tag scanner by applying one or more conventional algorithms to at least one of
      i. data implicit or explicit in the tag's design features and sensed by the tag scan sensor,
      ii. data from one or more of the tag scanner's physical orientation sensors,
   e. providing at least one of
      i. the information system has one or more application contexts that can be controlled by means of a tag scanner activity,
      ii. the tag has a data payload which will be decoded upon scanning by means of conventional algorithm and then can be modified or parsed or otherwise conventionally processed by means of a tag scanner activity,
   f. providing a means by which the tag can be brought within scan range of the tag scan sensor of the tag scanner and then held there until scanned by the scan sensor,
   g. providing, optionally, markings on or around the tag which indicate to a scanner user or user entity the expected scanner activity request that will be the outcome of a scan performed with a respective relative orientation between scanner sensor and the tag,
   h. providing an estimate of the relative orientation during the tag scan, which is between a predefined as default orientation of the tag scan sensor and a predefined as default orientation of the local tag being scanned,
   i. providing a predefined set of scanner activities that each control one or more predefined application related aspects of at least one of
      i. one or more of the application context or application contexts of the information system,
      ii. modification or parsing or otherwise conventionally processing the decoded data payload of the tag,
   j. providing a conventional means to issue a request to the scanner that any particular one of the set of scanner activities be performed,
   k. defining a set of at least two quantized values for estimated relative orientation, for representing the possible range of the provided value of estimated relative orientation,
   l. defining a mapping, by conventional means of a look up table or a mapping algorithm, between each of the available quantized values for estimated relative orientation and a respective one of the known set of scanner activity requests,
   m. rounding the provided estimate of relative orientation between tag and scanner sensor to the nearest one of the available quantized values for estimated relative orientation as the value of quantized estimated relative orientation which represents the estimated physical manner with which the tag was scanned,
   n. applying the mapping of quantized estimated relative orientation to scanner activity request to the value of quantized relative orientation in order to determine the selected scanner activity request,
   o. using the provided means to make the selected scanner activity request to the scanner,
      whereby a selected one of a predefined set of scanner activities each of which exercises specific control over at least one of, one or more application contexts of the information system of which the scanner is a part or modification or parsing or otherwise conventionally processing the decoded data payload of the tag, will be efficiently requested by means of the single action of locally scanning a tag with a physical manner that constrains the range of relative orientation between the scanner sensor and the tag to within a respective predefined range.

2. The method of claim 1 wherein said provided estimate of the relative orientation during the tag scan is between a predefined as default orientation of the tag scan sensor and a predefined as default orientation of the local tag being scanned, and is estimated as their relative rotation about an axis perpendicular to the two dimensional plane of the tag scanner sensor.

3. The method of claim 1 wherein said provided estimate of the relative orientation during the tag scan is between a predefined as default orientation of the tag and a predefined as default orientation of some other predefined local object whose orientation relative to the scanner is known to the scanner.

4. The method of claim 1 wherein
   i. rounding the provided estimate of relative orientation between tag and scanner sensor to the nearest one of the available quantized values for estimated relative orientation as the value of quantized estimated relative orientation which represents the estimated physical manner with which the tag was scanned,
   ii. applying the mapping of quantized estimated relative orientation to scanner activity request to the value of quantized relative orientation in order to determine the selected scanner activity request,
are combined into a single operation.

5. A single action local tag scan method for providing a one of a plurality selection of scanner activity request, comprising:
   a. providing that the method is implemented within a tag scanner device which forms all or part of a mobile or static information system,
   b. providing the tag scanner device is implemented by firmware or software, running on any combination of conventional computer, processor or logic device, and that it has one or more types of local tag scan sensor functionally and physically integrated with it,
   c. providing, optionally, that the tag scanner device has one or more conventional physical position sensors having fixed position relative to the scanner sensor, and that are functionally and physically integrated with it,
   d. providing a local information tag intended for use with one or more of the application context or application contexts of the information system, which when moved to within scan range will be scanned by the tag scan sensor, and whose relative position during the scan will be estimated by the tag scanner by applying one or more conventional algorithms to the
      i. data implicit or explicit in the tag's design features and sensed by the tag scan sensor,
      ii. data from one or more of the tag scanner's physical position sensors,
   e. providing at least one of
      i. the information system has one or more application contexts that can be controlled by means of a tag scanner activity,
      ii. the tag has a data payload which will be decoded upon scanning by means of conventional algorithm and then can be modified or parsed or otherwise conventionally processed by means of a tag scanner activity,
   f. providing a means by which the tag can be brought within scan range of the tag scan sensor of the tag scanner and then held there until scanned by the scan sensor,
   g. providing, optionally, markings on or around the tag which indicate to a scanner user or user entity the expected scanner activity request that will be the outcome of a scan performed with a respective relative position between scanner sensor and the tag,
   h. providing an estimate of the relative position during the tag scan, which is between a predefined as default point on the tag scan sensor and a predefined as default point on the local tag being scanned,
   i. providing a predefined set of scanner activities that each control one or more predefined application related aspects of at least one of
      i. one or more of the application context or application contexts of the information system,
      ii. modification or parsing or otherwise conventionally processing the decoded data payload of the tag,
   j. providing a conventional means to issue a request to the scanner that any particular one of the set of scanner activities be performed,
   k. defining a set of at least two quantized values for estimated relative position, for representing the possible range of the provided value of estimated relative position,
   l. defining a mapping, by conventional means of a look up table or a mapping algorithm, between each of the quantized values for estimated relative position and a respective one of the known set of scanner activity requests,
   m. rounding the provided estimate of relative position between tag and scanner sensor to the nearest one of the available quantized values for estimated relative position as the value of quantized estimated relative position which represents the estimated physical manner with which the tag was scanned,
   n. applying the mapping of quantized estimated relative position to scanner activity request to the value of quantized estimated relative position in order to determine the selected scanner activity request,
   o. using the provided means to make the selected scanner activity request to the scanner,
      whereby a selected one of a predefined set of scanner activities each of which exercises specific control over at least one of, one or more application contexts of the information system of which the scanner is a part or modification or parsing or otherwise conventionally processing the decoded data payload of the tag, will be efficiently requested by means of the single action of locally scanning a tag with a physical manner that constrains the range of relative position between the scanner sensor and the tag to within a respective predefined range.

6. The method of claim 5 wherein said provided estimate of the relative position during the tag scan is between a predefined as default point of the tag scan sensor and a predefined as default point of the local tag being scanned, and is estimated as their two dimensional relative position in the plane of the tag scanner sensor.

7. The method of claim 5 wherein said provided estimate of the relative position during the tag scan is between a predefined as default point of the tag and a predefined as default point of some other predefined local object whose location relative to the scanner is known to the scanner.

8. The method of claim 5 wherein
   i. the provided estimate of relative position between tag and scanner sensor to the nearest one of the available quantized values for estimated relative position as the value of quantized estimated relative position which represents the estimated physical manner with which the tag was scanned,
   ii. applying the mapping of quantized estimated relative position to scanner activity request to the value of quantized estimated relative position in order to determine the selected scanner activity request
are combined into one operation.

9. A single action local tag scan method for providing a one of a plurality selection of scanner activity request, comprising:

a. providing that the method is implemented within a tag scanner device which forms all or part of a mobile or static information system,
b. providing the tag scanner device is implemented by firmware or software, running on any combination of conventional computer, processor or logic device, and that it has one or more types of local tag scan sensor functionally and physically integrated with it,
c. providing, optionally, that the tag scanner device has one or more conventional physical path of motion sensors having fixed position relative to the scanner sensor, and that are functionally and physically integrated with it,
d. providing a local information tag intended for use with one or more of the application context or application contexts of the information system, which when moved to within scan range will be scanned by the tag scan sensor, and whose relative path of motion during a predefined period following the tag scan, will be estimated by the tag scanner by applying one or more conventional algorithms to the
   i. data implicit or explicit in the tag's design features and sensed by the tag scan sensor,
   ii. data from one or more of the tag scanner's physical position sensors,
e. providing at least one of
   i. the information system has one or more application contexts that can be controlled by means of a tag scanner activity,
   ii. the tag has a data payload which will be decoded upon scanning by means of conventional algorithm and then can be modified or parsed or otherwise conventionally processed by means of a tag scanner activity,
f. providing a means by which the tag can be brought within scan range of the tag scan sensor of the tag scanner and then held there until scanned by the scan sensor,
g. providing, optionally, markings on or around the tag which indicate to a scanner user or user entity the expected scanner activity request that will be the outcome of a scan performed with a respective relative path of motion between scanner sensor and the tag,
h. providing an estimate of the relative path of motion during a predefined period following the tag scan, which is between a predefined as default point on the tag scan sensor and a predefined as default point on the local tag being scanned,
i. providing a predefined set of scanner activities that each control one or more predefined application related aspects of at least one of
   i. one or more of the application context or application contexts of the information system,
   ii. modification or parsing or otherwise conventionally processing the decoded data payload of the tag,
j. providing a conventional means to issue a request to the scanner that any particular one of the set of scanner activities be performed,
k. defining a set of at least two quantized values for estimated relative path of motion, for representing the possible range of the provided value of estimated relative path of motion,
l. defining a mapping, by conventional means of a look up table or a mapping algorithm, between each of the quantized values for estimated relative path of motion and a respective one of the known set of scanner activity requests,
m. rounding the provided estimate of relative path of motion between tag and scanner sensor to the nearest one of the available quantized values for estimated relative path of motion as the value of quantized estimated relative path of motion which represents the estimated physical manner with which the tag was scanned,
n. applying the mapping of quantized estimated relative path of motion to scanner activity request to the value of quantized estimated relative path of motion in order to determine the selected scanner activity request,
o. using the provided means to make the selected scanner activity request to the scanner,
   whereby a selected one of a predefined set of scanner activities each of which exercises specific control over at least one of, one or more application contexts of the information system of which the scanner is a part or modification or parsing or otherwise conventionally processing the decoded data payload of the tag, will be efficiently requested by means of the single action of locally scanning a tag with a physical manner that constrains the range of relative path of motion between the scanner sensor and the tag to within a respective predefined range.

10. The method of claim 9 wherein said provided estimate of the relative path of motion during the tag scan is between a predefined as default point of the tag scan sensor and a predefined as default point of the local tag being scanned, and is estimated as their two dimensional relative path of motion in the plane of the tag scanner sensor.

11. The method of claim 9 wherein said provided estimate of the relative path of motion during the tag scan is between a predefined as default point of the tag and a predefined as default point of some other predefined local object whose path of motion relative to the scanner is known to the scanner.

12. The method of claim 9 wherein
i. rounding the provided estimate of relative path of motion between tag and scanner sensor to the nearest one of the available quantized values for estimated relative path of motion as the value of quantized estimated relative path of motion which represents the estimated physical manner with which the tag was scanned,
ii. applying the mapping of quantized estimated relative path of motion to scanner activity request to the value of quantized estimated relative path of motion in order to determine the selected scanner activity request,
are combined into one operation.

* * * * *